Sept. 17, 1940.  F. O. HESS  2,215,080

GAS HEATED FURNACE AND METHOD OF OPERATING SAME

Filed Oct. 17, 1936  2 Sheets-Sheet 1

INVENTOR
FREDERIC O. HESS
BY
John E. Hubbell
ATTORNEY

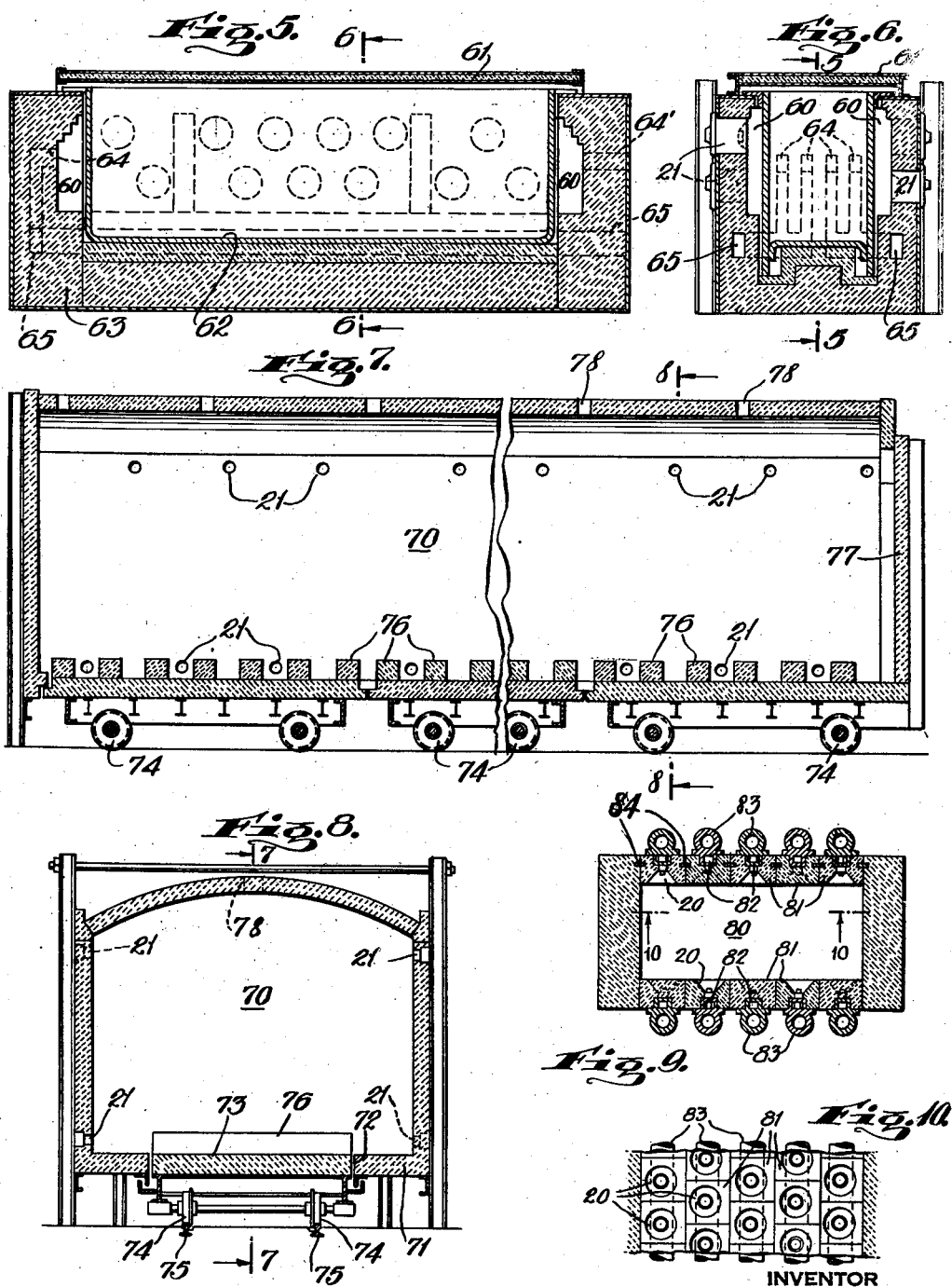

Patented Sept. 17, 1940

2,215,080

UNITED STATES PATENT OFFICE 2,215,080

GAS HEATED FURNACE AND METHOD OF OPERATING SAME

Frederic O. Hess, Philadelphia, Pa., assignor to The Selas Company, Philadelphia, Pa., a corporation of Pennsylvania Application October 17, 1936, Serial No. 106,208

7 Claims. (Cl. 263—3)

The general object of the present invention is to provide improvements in the construction and method of operation of a furnace heated by the combustion of gaseous fuel, to the end of maintaining an atmosphere within the furnace chamber which is definitely oxidizing, neutral or reducing, or which has some other special characteristic or composition, as conditions of operation make desirable, and to the end of permitting the maintenance when conditions require of a combustion chamber temperature which is as high as the maximum required in any ordinary industrial furnace operation, and which is substantially higher than is obtainable with any gas fired furnace heretofore available for a furnace operation requiring closed regulation of the furnace chamber atmosphere.

In accordance with the present invention, I provide cavities or burner spaces in the wall of the furnace chamber and each open at its inner side to the chamber, and supply a fuel gas and combustion air mixture to, and complete its combustion within, each of said cavities or spaces, and I proportion the combustion air and fuel ratio of the mixture as required to make the products of combustion neutral or oxidizing, or reducing as conditions require, so that with complete combustion within the burner space, the products of combustion passing from the combustion space into the furnace chamber are of the fixed composition determined by the oxygen and fuel gas constituents of the mixture and the relative proportions of those constituents. By the procedure, I am enabled to maintain very high combustion space temperatures, which contribute both to the continuous maintenance of the desired products composition, efficient combustion, the transfer of a large portion to the furnace chamber and to the material or articles heated therein, of a large portion of the heat liberated by radiation.

While the present invention is adapted for use in furnaces varying widely in their construction, and in the industrial operations for which they are primarily devised and used, the invention is of special utility for metallurgical operations such as annealing, and particularly so called bright annealing, and the present comprises a novel furnace devised for the continuous bright annealing of copper and other strip material and including features of construction and arrangement pertaining to the movement of the strip material treated through the furnace chamber and its exposure to radiant heat, which are peculiarly adapted for use in the practice of my improved method of heating and controlling the atmosphere within the furnace chamber.

The various features of novelty which characterize the present invention are pointed out with particularity in the claims annexed to and forming a part of this specification. For a better understanding of the present invention, however, and specific objects and advantages attained with it, reference should be had to the accompanying drawings and descriptive matter in which I have illustrated and described preferred embodiments of the present invention.

Fig. 5 is a section taken on the line 5—5 of Fig. 6; and Fig. 6 is a section taken on the line 6—6 of Fig. 5, which collectively illustrate a galvanizing pot furnace in connection with which my improved heating method may be employed; and Fig. 7 is a section on the line 7—7 of Fig. 8; and Fig. 8 is a section on the line 8—8 of Fig. 7, which collectively illustrate the use of my improved method in a so called car-hearth furnace;

Fig. 9 is a sectional elevation of another type of furnace in which my improved method may be used with advantages; and Fig. 10 is a section on the line 10—10 of Fig. 9.

Figure 1:
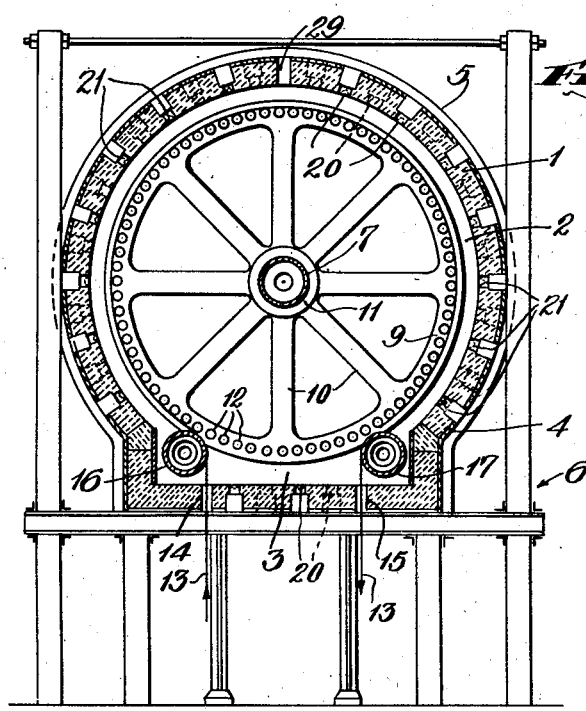
Fig. 1 is an elevation of a continuous strip annealing furnace, in section on the line 1—1 of Fig. 2.
Figure 2:
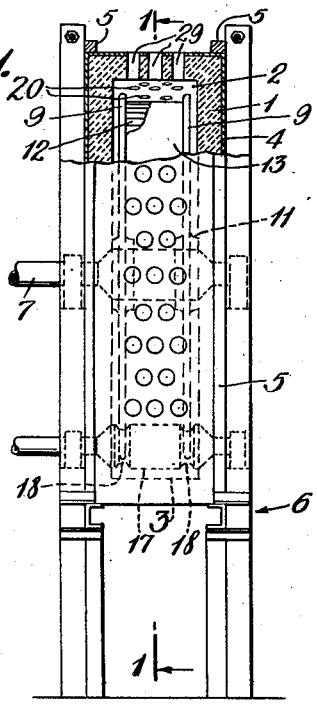
Fig. 2 is an elevation at right angles to Fig. 1 and partly broken away and in section.
Figure 3:
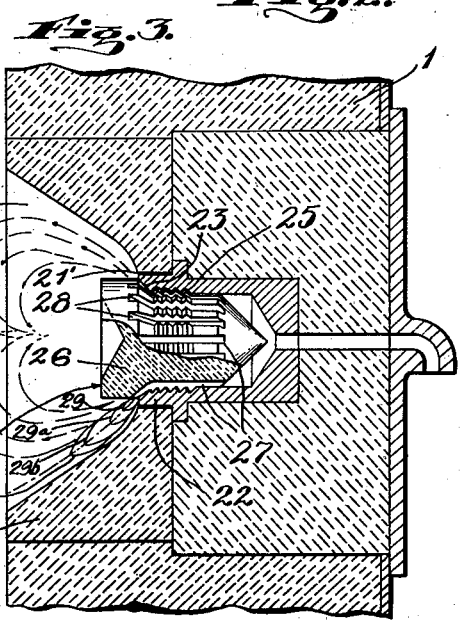
Fig. 3 is an enlarged section, through a portion of the furnace chamber wall of the furnace shown in Figs. 1 and 2, illustrating a preferred combustion space and burner arrangement.

The strip annealing furnace shown in Figs. 1, 2, and 3, comprises a furnace chamber wall 1, of refractory material enclosing a furnace chamber 2 which is in the form of a short cylinder having a horizontal axis, and provided with a shallow bay extension 3, rectangular in horizontal cross section, at its underside. The refractory material of the furnace wall may be encased by sheet metal 4 and supported and held in place by an external armor 5 and supporting framework 6, constructed and arranged in accordance with the general practice of the furnace construction art.

Within and co-axial with the cylindrical portion of the furnace chamber 2, is a rotatable drum or cage like structure, the shaft 7 of which is journaled in the end walls of the furnace chamber. The drum comprises two spider like end members each including a rim portion 9 connected by spokes 10 to a hub portion 11, anchored on the shaft 7. The rim portions 9, of the two end members are connected by a multiplicity of horizontal bar elements 12, each of which may well be a tube section of alloy steel rigidly secured at its opposite ends to the rim portions 9 of the two end members. The elements 12 are arranged about the axis of the shaft 7, which is of sufficient diameter, and in which the elements 12 are spaced sufficiently closely together, to avoid objectionable bending of the strip material 13 to be annealed, which is looped about the strip engaging portion of the drum formed by the elements 12. The drum diameter employed is determined, and depends upon, the desired lineal rate of travel of the strip 13, and the time interval in which each short longitudinal section of the strip needs to be within the furnace chamber to secure the annealing effect for which the furnace is used. Merely by way of illustration and example, and not by way of limitation, it is noted that the effective drum diameter in the particular furnace design shown, is twelve feet.

The strip material 13 enters the furnace chamber through a slot 14 in the bottom wall of the bay portion 3 of the furnace chamber, and leaves through another slot 15 in that bottom wall portion. The entering strip passes into engagement with the drum element 12 over a guide roll 16 and passes out of engagement with the drum to the slot 15 over a similar guide roll 17. The guide rolls 16 and 17 are advantageously spaced apart as shown, and are each parallel to the drum shaft 7, and like the latter, have their supporting shaft journaled in the end walls of the furnace chamber. As shown, the rim portions 9 of the drum extend into circumferential grooves 18 formed in the rollers 16 and 17, whereby each of the rollers is held against axial movement relative to the drum. One of the rollers 16 may be positively rotated through an external driving connection, not shown, to its shaft, and thereby frictionally drive the other roller and the drum, or the drum may be positively driven through an external connection, not shown, to the shaft 7 and thereby frictionally drive the rollers, or in some cases, both rollers and the drum may be positively driven at the proper speeds, but in any event, care must be taken in handling hot strip material, to avoid putting the strip under tension sufficient to stretch or elongate it.

The heating means shown for the furnace chamber 2, comprise a multiplicity of combustion spaces 20, each in the form of a cup-shaped cavity as shown in Fig. 3, said spaces being formed in the cylindrical wall of the furnace chamber, and burner means associated with each of said cavities. Each cavity 20 opens at its large diameter end into the furnace chamber, the rim of the open end of the cavity being thus flush with the concave inner surface of the corresponding portion of the furnace wall 1. As shown, the combustion spaces, or cavities 20, are arranged in side by side horizontal rows closely spaced along the cylindrical portion of the wall 1, as shown there are three cavities in rows which alternate with rows containing two cavities, the cavities in adjacent rows being staggered. It will be understood, however, that the spacing and number of the combustion spaces 20, will vary with conditions, and, in particular, that the number of cavities will vary, other things being equal, with the dimensions of the furnace chamber.

As shown, each cavity 20, is formed in a special refractory burner block 21 incorporated in the cylindrical portion of the furnace chamber wall 1 and formed with a central axial passage 21' extending outwardly from the cavity 20. Inserted in that passage is a tubular metallic burner part 22, having its inner end surface 23 beveled or conical. Mounted in each metallic part 22 is a burner tip member 24 of refractory material, which, as shown, comprises an externally threaded body portion 25 screwed into the metallic part 22, which is internally threaded for the purpose. The tip member comprises a head portion 26 co-axial with the body portion 25, but larger in diameter than the latter, so that the head portion extends radially outward and overlaps the end of the metallic part 22.

Each burner tip member 24 is formed with a multiplicity of axially extending peripheral grooves 27 having outwardly inclined end portions 28, so that the bottom walls of the groove end portions are parallel to the beveled or conical end surface 23 of the metallic part 22. The otherwise open outer sides of the grooves 27, are closed by the metallic part 22, and the grooves thus form burner orifice channels which deliver combustible fuel air mixture, supplied through the axial passage in each tubular metallic part 22, into the corresponding cavity 20 in the form of jets inclined away from the axis of the burner. The portions of the jets immediately adjacent the discharge ends of the burner supply channels are parallel to the surface elements of a cone, but the jets which ignite on entrance into the cavity 20, bend inward toward the axis of the cavity as indicated in Fig. 3, due, as I believe, to the tendency of the jets to make the pressure within the general conical space surrounded by the jets, slightly below the general combustion chamber pressure, in consequence of the aspirating effect of the jets. In any event, the jets do have the general curvature illustrated in Fig. 3 as possessed by the jets of varying lengths having inner flame cone tips 29, 29a, 29b and 29c, and the existence of the curvature is plainly discernible, in the operation of the burner.

The wall of the cavity 20 should conform to the shape of the jets, so that the inner flame cone of the jet, while close to, will not impinge against the cavity wall, regardless of whether the jet is long or short. In Fig. 3, the inner flame cones or jets of different length are indicated and designated by the symbols 29, 29a, 29b, 29c. While the inner flame cones should not impinge against the cavity wall, they should extend into close proximity thereto, so that the portion of the cavity wall surface alongside each flame will be uniformly heated to incandescence, for a length corresponding to the length of the flame. Such cavity wall heating is practically essential to the maintenance of the desired efficiency of combustion and to the transfer of a large portion of the heat liberated from the cavity by radiation from the cavity wall and from the flames. For the purpose of furnace chamber atmosphere control, it is essential that with any condition of operation, combustion should be complete and uniform, and this requires that the combustion be completed within the burner cavity under the influence of the adjacent incandescent cavity wall. In the desirable construction shown in Fig. 3, the inclination to the burner axis of the inclined outer end portions 28 of the channels 27 and of the surface elements of the conical surface 23, is approximately 45°. While that angle may vary through a considerable range between limits, respectively, less than and greater than 45°, it is practically essential that the angle of inclination should be such that the space or cavity 20, is definitely cup-shaped. The cup-shape of the space 20 contributes to the maintenance of the entire curved wall of said space 20, or with relatively short flames, of the zone of said wall immediately adjacent the flames, at a temperature high enough to insure efficient combustion conditions and the desired heat radiation. As will be apparent, with the cup-shape of the cavity 20, every portion of the curved cavity wall is in position to receive a significant amount of heat by radiation from a portion of said wall at the opposite side of the burner axis. Such radiation of heat to one portion of the wall from another portion at the opposite side of the burner axis, necessarily diminishes as the cavity is shortened or flattened, and could not occur at all if the wall of the cavity were flattened out into a plane surface.

Although the flame jets are located adjacent the wall of the cavity 20, and diverge from the burner axis at all points along their lengths, the entire cavity is filled with burning gases and hot gaseous products of combustion. The latter circulate in the cavity and in the immediately adjacent portion of the furnace chamber proper, generally, as indicated, by the arrows and the lines curving inwardly toward the burner axis, which are shown in Fig. 3. Apparently, hot gases are continuously passing into the portion of the cavity surrounded by the flames along the portions of the flues relatively remote from the burner tip member, and gases are continuously passing from said space portion into or between the portions of the flames nearer to the burner tip member.

The burner illustrated in Fig. 3 is constructed and operates in accordance with inventive principles disclosed and forming the subject matter of my prior application, Serial No. 88,744, filed July 3, 1936. As explained in said prior application, it is not essential that a burner of the character shown in Fig. 3 should include a metallic part 22. On the contrary, the refractory burner tip member 24 may be directly anchored in the passage 21' of the refractory burner block 21. The refractory tip member 24 when used with a metallic burner part 22 protects the latter against overheating, and because of its poor heat conductivity and the cooling action of the mixture flow through the burner channels, avoids a temperature within the burner channels, which is high enough for the ignition of the mixture in the channels. In many cases, however, it is practically convenient, to provide a metallic part, like or analogous to the part 22, which can be easily connected to the piping external to the furnace chamber, and not illustrated in the drawings, through which the fuel gas and air mixture is passed to the burners from suitable mixture forming apparatus, such, for example, as the mixing machine widely used and known as the "Selas" mixing machine.

As already indicated, with the complete combustion effected in the combustion cavities, the products of combustion formed in the cavities and passing from the latter into the furnace chamber are of uniform composition with any given fuel gas and air mixture, their composition being directly dependent on the chemical constituents and proportions of the mixture.

In the furnace shown in Figs. 1 and 2, the furnace chamber is provided with vents 29 for the escape of products of combustion, though some of the products may well be discharged through the bottom ports 14 and 15, and when so discharged, serves effectually to prevent the influx of air through those ports in normal operation, so as to avoid need for the use of any special baffling or curtain means to seal the joints between the walls of the passages 14 and 15 and the strip material moving through these passages.

Figure 4:
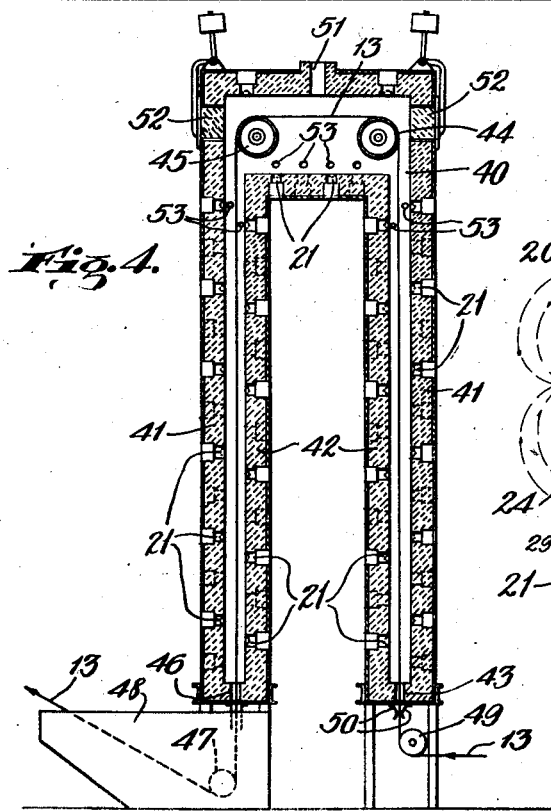
Fig. 4 is a somewhat diagrammatic elevation in section of a second form of continuous strip annealing furnace.

In the modified continuous strip annealing furnace shown in Fig. 4, the furnace chamber 40 is in the form of an inverted U with the leg portions of the furnace chamber between the adjacent leg portions of inner and outer furnace walls 41 and 42, respectively, and each in the form of an inverted U. In Fig. 4, the strip material 13 enters the furnace chamber through a slot 43 in the bottom wall of one of the furnace chamber U legs, and passes upward over a guide roll 44 in the yoke portion of the furnace chamber, and thence over a second guide roll 45 in said yoke portion, from which the strip material passes down through the second furnace chamber leg. The strip passes from the latter through a discharge slot 46 in the bottom wall of said second furnace chamber leg. Beneath the passage 46, is a guide roll 47, located in a quenching tank 48, through which the annealed strip is passed and cooled prior to its delivery from the annealing apparatus. The strip material is guided in its movement into the entrance slot 43 by a guide roll 49, and as shown, flexible curtain strips 50 are provided at the entrance end of the passage 43, to bear against the opposite sides of the strip and prevent the influx of air into the furnace chamber through the passage 43. In the construction shown in Fig. 4, products of combustion are discharged through a vent or stack connection 51 opening through the top of the outer furnace chamber wall 41.

The furnace chamber 40 of Fig. 4 is heated by gas burner means which may be identical with those illustrated in Fig. 3. In Fig. 4, the various burner cavities are distributed along both walls of each furnace chamber leg portion, and in addition, burner cavities are formed in the upper surface of the yoke portion of the inner U shaped wall 42. Doors 52 are formed in opposed portions of the outer wall 41 adjacent the top of the furnace to permit access to the yoke portion of the furnace chamber, and particularly, to facilitate the threading of the strip material over the rolls 44 and 45 preparatory to a strip annealing operation. Suitable ignition openings 53 into the furnace chamber, normally closed by plugs or doors, are provided for the initial ignition of the fuel jets in the burner cavities, in starting the furnace into operation.

In the galvanizing kettle furnace illustrated in Figs. 5 and 6, the furnace chamber 60 is in the form of an elongated space generally rectangular in cross section and closed at its top by a removable cover 61, the latter not only serves as a cover for the chamber 60, but for the top of the box-like kettle 62, insertable in the chamber 60, when the removable end wall 63 is displaced for the purpose.

Burner cavities 20, which may be similar in form to those previously in use described, are distributed along the opposing side walls of the chamber 60. Products of combustion are withdrawn from the end of the chamber 60, which is normally closed by the removable end wall 63, through ports 64 in said end wall and channels 65, each of which comprises a portion 65 adjacent the bottom of the furnace and leading horizontally through the latter and through the stationary end wall of the furnace. Ports 64', formed in the last mentioned end wall, are provided for the direct discharge of products of combustion from that end of the furnace chamber.

The maintenance of an inert atmosphere in the furnace chamber 60 is desirable to avoid attack by the furnace chamber gases on the metal within the furnace chamber, and the uniformity of heat distribution made possible by the use of the distributed combustion spaces 20 and the uniform combustion therein, is of especial importance, because of the destructive action of the zinc on the overheated portions of the metallic steel kettle 62, and also because uneven heating of the kettle increases the formation of dross.

In Figs. 7 and 8, I have illustrated the use of the present invention in the chamber 70 of a furnace of the so called car hearth type, adapted for use in annealing or otherwise heat treating articles mounted on the refractory bodies 73 of work supporting cars, which have their bodies extending through a slot 72 formed in the refractory bottom wall 71 of the furnace chamber. As shown, the car hearth is formed by bodies of three end to end cars, each having wheels 74 running on track rails 75 beneath the furnace chamber bottom wall 71. To accommodate the movement of the cars into and out of the furnace chamber, at the beginning and end, respectively, of a heat treating operation, the furnace is provided with a removable end wall 77.

The furnace chamber 70 is heated by the combustion of a combustible mixture in the burner cavities in refractory blocks 21 of the character previously described, which are arranged in the opposing side walls of the furnace and are advantageously staggered as indicated. As shown, the burner cavity blocks 21 in each wall are arranged in one upper row and one lower row, and the burner cavities in the lower wall open in line with the spaces between transverse work supporting beams 76, of refractory material mounted on and forming upwardly extending rib projections from car bodies proper. Products of combustion escape from the furnace chamber 70 through opening 78 formed in the furnace roof or crown.

In the furnace construction illustrated in Figs. 9 and 10, the furnace chamber 80 is heated by the combustion of a combustible mixture in burner cavities 20 formed in the top and bottom walls of the furnace chamber. In the particular construction shown in Figs. 9 and 10, each of the top and bottom walls of the furnace chamber is formed by blocks 81 of refractory material, square in cross section, and each formed with a burner cavity 20. The blocks 81 in each wall are arranged in rows, and the cavities 20 in each row receive the fuel and air mixture from a corresponding external manifold or supply pipe 83, extending longitudinally of the row, and having outlet portions 82, one for each of the blocks 81 in the row. Preferably, and as shown, the burner blocks 81 in adjacent rows are staggered as shown in Fig. 10. The burner blocks 81 in adjacent rows of the upper wall of the furnace are interlocked by metallic reinforcing bars 84.

My improved method of heating is adapted for use with advantage, not only in connection with furnaces of the type illustrated, but generally in heating any furnace chamber in which close and definite control of the furnace atmosphere, uniform heating or relatively high furnace temperatures, is desirable, and the invention permits of direct gas firing of furnace chambers for use in carrying out industrial furnace operations which have heretofore been practically possible only in furnaces having electrical or muffle heating provisions.

The strip annealing furnace arrangements shown in Figs. 1–4 are especially suitable for their intended use, not only because the manner in which they are heated provides the uniformity of heat distribution to the work and the control of the furnace atmosphere required for the proper continuous annealing of strip material, but also because of the simple and effective means provided for guiding the strip material through the furnace.

The strip material treated in the furnace shown in Figs. 1–4, may be in the form of bands of sheet copper, steel, brass, or other metal, or in the form of metal wires. The annealing of such strips is ordinarily so called "bright annealing," which requires a very close control of the furnace chamber atmospheres. The desirable atmospheres will be different for different metals, and metal conditions, and will be slightly reducing in some cases, definitely oxidizing in some cases, and inert or neutral in some cases.

While the present invention permits of the maintenance of desirable furnace chamber temperatures in furnaces used for some purposes, which are higher than are obtainable in furnaces suitable for such purposes when heated by gas firing in accordance with methods heretofore employed, the transfer of the relatively large portion of the heat liberated by radiation and the control of the furnace chamber atmosphere, which are characteristic of the present invention make the use of the present invention advantageous in connection with furnaces or ovens such as enamelling furnaces and baking ovens and furnaces and ovens used for various chemical processes or operations, in which the material treated attains a temperature of a few hundred degrees only.

Having now described my invention, what I claim as new and desire to secure by Letters Patent is:

1. The method of heating and controlling atmospheric conditions within a furnace chamber, which consists in supplying a combustible fuel gas and air mixture to and burning it wholly within combustion spaces each opening to the chamber and formed in refractory material in the chamber wall and heated to incandescence by the combustion in the space, whereby complete and uniform combustion is effected in each such combustion space, and a large portion of the liberated heat is radiated into the furnace chamber from said spaces, and the products of combustion passing into the chamber from said spaces is of a uniform composition controlled by and dependent upon the composition of the mixture.

2. A furnace comprising a furnace chamber and refractory walls enclosing said chamber and formed with cup-shaped cavities, each open at one side to said chamber and means for heating the walls of said cavity to incandescence by supplying a mixture of fluid fuel and air for its combustion to each of said cavities in a multiplicity of finely divided jets, each extending alongside, and in close proximity to the cavity wall for a distance sufficient for the complete combustion of the mixture within the cavity so that the products of combustion passing from the cavities into the furnace chamber have a composition wholly dependent on the composition of the mixture, and a large portion of the heat liberated is radiated into said chamber.

3. A strip annealing furnace, comprising a furnace chamber having an inlet and an outlet, means within the chamber for guiding a traveling material strip along an elongated path extending from said inlet to said outlet and adjacent a correspondingly elongated portion of the wall of the furnace chamber, said wall portion including refractory material with combustion spaces formed therein and distributed along the major part of the length of said portion and open to said furnace chamber, and means for supplying a combustible fuel gas and air mixture to each of said spaces and effecting its combustion therein.

4. A strip annealing furnace, comprising a furnace chamber having a peripheral wall extending circularly about a horizontal axis, a drum within said chamber and adapted to rotate about a horizontal axis to thereby move strip material looped about the drum along a path of movement parallel and adjacent to said peripheral wall, burner cavities formed in said peripheral wall at the inner side thereof and distributed at intervals along the major portion of the angular extent of said wall, and means for passing a combustible fuel gas and air mixture into, and burning it in said cavities.

5. A strip annealing furnace, comprising a combustion chamber in the form of an inverted U with a refractory inner wall and a refractory outer wall, each of said walls being in the form of an inverted U with each leg of the U separate and distinct from the other leg of the U, means for moving strip material through said chamber, said walls being formed with burner spaces opening to the furnace chamber in each leg thereof and at the opposite sides of the path of the strip material, and means for supplying a combustible fuel gas and air mixture to and burning it in said spaces.

6. The combination with the wall of a heating chamber, of a plurality of gas burner units incorporated in said wall and each comprising refractory material formed with a combustion space cavity extending outwardly from the innerside of said wall and diminishing in cross section as the distance from said innerside increases, and comprising a combustible supply chamber at, and opening to the outer side of said cavity and having a conical wall portion adjacent said cavity, a refractory burner tip member having a portion extending into said opening and having a head portion extending into said cavity with a conical peripheral surface parallel to and engaging said conical wall portion, said tip member having surface grooves, the walls of which unite the wall of chamber to form burner outlet channels from said chamber, each of said channels having a discharge end portion one side of which is formed by said conical wall portion, and means for passing a combustible mixture of air and gas into said supply chamber for outflow therefrom through said channels in jets adapted to be completely burned in said cavity.

7. A furnace having a heating chamber and a refractory wall for said chamber and a plurality of burners, each comprising a refractory body incorporated in said wall and formed with a combustion space open to said chamber at its inner end and increasing in cross section with the distance from the outer end thereof, and comprising means for passing a combustible air and gas mixture into said space including a multiplicity of supply channels opening to said space at distributed points adjacent the margin of the outer end of said space, so that the mixture discharged by said channels may form burning jets respectively adjacent and alongside sections of the wall of said space which extend away from its said outer end, and are adapted to be heated to incandescence by said jets, the discharge end portions of said channels and said wall sections being relatively shaped and disposed to avoid impingement of the inner flame cone portions of the burning jets against said wall sections, each of said bodies being polygonal in outline and the bodies of said plurality of burners arranged edge to edge in the furnace chamber wall.

FREDERIC O. HESS.